INVENTOR.
FRANCIS J. TYTUS AND
THEODORE D. STRIGGLES,

United States Patent Office 3,227,789
Patented Jan. 4, 1966

3,227,789
PROCESS OF PELLETIZING A WATER SOLUBLE MATERIAL
Francis J. Tytus and Theodore D. Striggles, Cincinnati, Ohio, assignors to The Chemical and Industrial Corp., Cincinnati, Ohio, a corporation of Ohio
Filed Apr. 12, 1961, Ser. No. 102,414
6 Claims. (Cl. 264—117)

The invention has to do with the manufacture of pellets of controlled size from substances which are soluble or have a soluble component. In many fields substances are desired in pelletized form for convenience in handling, storing, shipping, distribution, packaging or use. The invention is of utility in the making of pellets of any substances, solid at normal tempeartures of handling or use, which substances are soluble in water, in water solutions, or in other solvents amenable to the process, or have a substantial soluble component. These include sugars, as in the making of confections, as well as substances in finely divided condition such as carbon or sulfur where the particles can be suspended in or mixed with a compatible soluble substance. For the sake of an exemplary showing herein, the invention will be described in connection with a fertilizer substance, namely ammonium nitrate which is water soluble and which may be used alone or along with other substances such as limestone, desirable in a fertilizer as a filler or for other purposes. Hereinafter the word "slurry" will be used to indicate a solution of a soluble substance, whether or not the solution contains non-soluble suspended material; and the terms "water soluble" and "water solution" should not be understood as excluding the use of other solvents.

Ammonium nitrate fertilizers, as well as a wide variety of other water soluble fertilizers, are conveniently shipped, stored, packaged and distributed upon the soil in the form of small pellets roughly ⅛ inch in diameter. The art has endeavored to make pellets in various ways. A water soluble substance in water solution may of course be spray dried; but spray drying tends to produce particles which are porous, hollow and of relatively little strength.

Where the amount of water is cut down in a solution to the point where the amount of solids constitutes all but a few percent by weight of the substance, it is possible to effect liquefication by heat, and to shower the liquefied solution in droplets from nozzles or apertured plates downwardly in a tower which contains drying gases. The solidification of the droplets occurs in large measure through the cooling of the hot liquid. Such an operation is generally referred to as "prilling." Drying is necessary, and freqeuntly requires a drying drum to act upon the pellets after they leave the tower. Drying also tends to diminish the density of the product.

The prilling of anhydrous or substantially anhydrous water soluble fertilizer substances such as ammonium nitrate is also practiced. This, however, requires either the original manufacture of the ammonium nitrate in anhydrous form, or if the ammonium nitrate is formed in solution, it requires the elimination of the water by drying operations prior to the prilling.

If the water soluble substance is available in finely divided form and a bed of such material is tumbled in a drum or agitated in a pug mill, it is possible by controllably wetting the particles in the bed to cause them to adhere together in more or less spherical pellets. The wetting may be done either with water or with a slurry as set forth above; but there is a critical "agglomerating point." If too little water is added the particles will not stick together, whereas if too much water is added a magma or mud is formed which precludes pelletizing. The amount of slurry which can be added is in any event very small, so that if the slurry constitutes the supply of fresh ammonium nitrate for pelletizing, the quantity of material which must be recirculated and reworked becomes excessive. In processes of this character, which are generally called agglomerating processes, it is not unusual to have to rework 8 or 10 pounds or more of material for every pound of saleable product which can be taken out of the process.

In an aglomerating process, wherein a tumbling mass or bed of particulate material is wetted with water or with slurry, it is necessary to add enough water to keep the moisture content of the material at or above the agglomerating point, since otherwise pellets will not form. The applied moisture penetrates to the core of the particles or pellets, and can only be eliminated therefrom by diffusion drying. Thus, even though the addition of water as such or as part of a slurry is carried on in the presence of hot drying gases, it is not practicable to dry the materials in the pug mill or drum to a desired low final moisture content. The condition cannot be ameliorated by employing gases at an excessively high temperature because by reason of the prolonged contact of the gases with the particulate material decomposition is likely to occur. Consequently a relatively low temperature limitation for the gases is imposed on the process. It becomes necessary further to dry the materials exiting from the pug mill or drum, which materials include both the relatively small proportion of saleable material and the relatively large proportion of material which must be recycled.

In U.S. Patent No. 2,926,079, in the name of Benjamin G. Smith, there is described a process in which nuclei of the water soluble substance are treated in a rotating drum having longitudinal vanes which pick up the nuclei in the bed and shower them downwardly across the drum. Hot drying gases are passed through the drum; and the nuclei in generally separated condition as they pass downwardly through the hot drying gases are sprayed with a slurry. The bed itself is maintained below the agglomerating point; and while the impingement of the sprayed slurry droplets on the falling nuclei will raise their surfaces temporarily above the agglomerating point, the drying action of the hot gases serves to lower the surface moisture content of the nuclei essentially before they return to the bed. During the tumbling action of the nuclei in the drum this spray-coating operation repeats itself a sufficient number of times to give pellets of the desired size on the average.

The procedure of the patent is advantageous because it permits the formation of pellets the substance of which is very largely derived from the slurry rather than from the agglomeration of previously dried particles. Also, the amount of material which must be reworked in the process is greatly cut down.

The process of the said patent is, however, a delicate one to maintain in continuous operation particularly with the apparatus and mode of procedure hitherto current. This invention is an improvement upon the procedure and apparatus of U.S. Letters Patent No. 2,926,079; and it has for its principal object the provision of a means and a process capable of continuous control in continuous operation, by which the theoretical advantages of the process may be more fully realized.

It is an object of the invention to provide a method for the positive and continuous manufacture of spherical pellets consisting largely of solids derived from a slurry, with provision against the occurrence of those conditions which tend either to degrade the product or to prevent continuous operation.

It is an object of the invention to provide a method for the formation of strong, dense, substantially spherical pellets without the necessity of after drying procedures.

It is an object of the invention to provide a process in which uniform and continuous conditions can be maintained throughout the length of a treatment drum of sufficient capacity to deliver pellets dry enough for handling, shipment and storage.

It is an object of the invention to provide a method having the above advantages and in which the limits of temperature of the hot drying gases are broadened while avoiding any great rise in temperature of the particulate material (after an initial preheating) during its travel through the drum.

These and other objects of the invention which will be set forth hereinafter or will be apparent to one skilled in the art are attained by that arrangement of devices and that mode of utilization thereof of which an exemplary embodiment will now be described. Reference is made to the accompanying drawings wherein.

Figure 1:
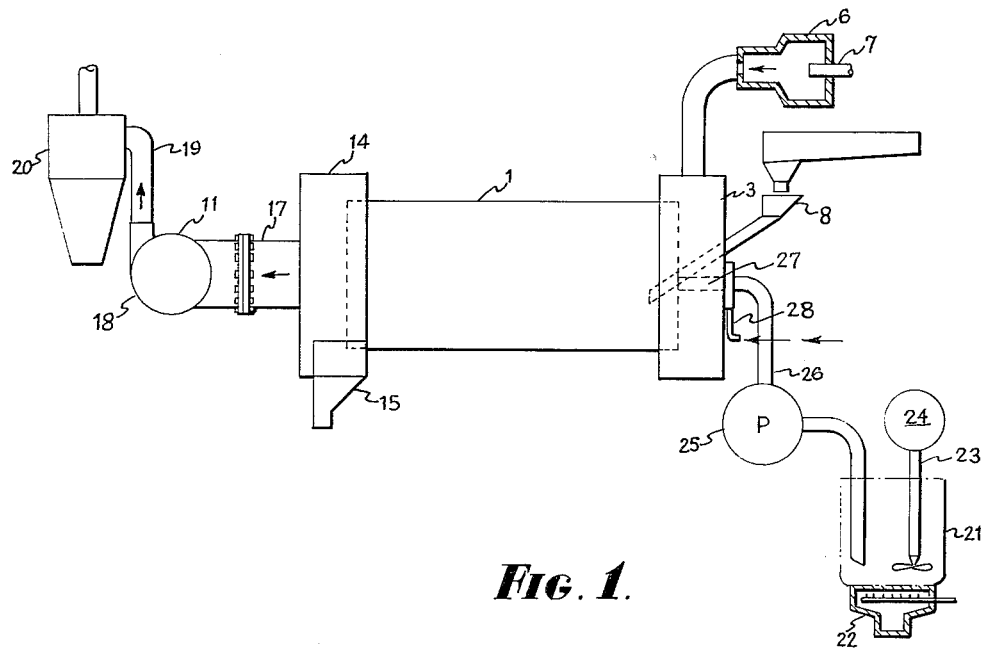
FIG. 1 is an elevational view of semi-diagrammatic character of an apparatus suitable for carrying on the invention.

In the apparatus used for the practice of the invention there is a hollow drum 1 of elongated form. This drum is mounted with its axis at a slight angularity to the horizontal, say, 5° or so; and it is mounted for rotation. This may be done after the manner in which rotary kilns are mounted; and driving means will be provided to rotate the drum at desired rates of speed. Since such means are well known in the art to those familiar with rotary kilns and driers, they have not been illustrated in the drawings hereof.

Figure 2:
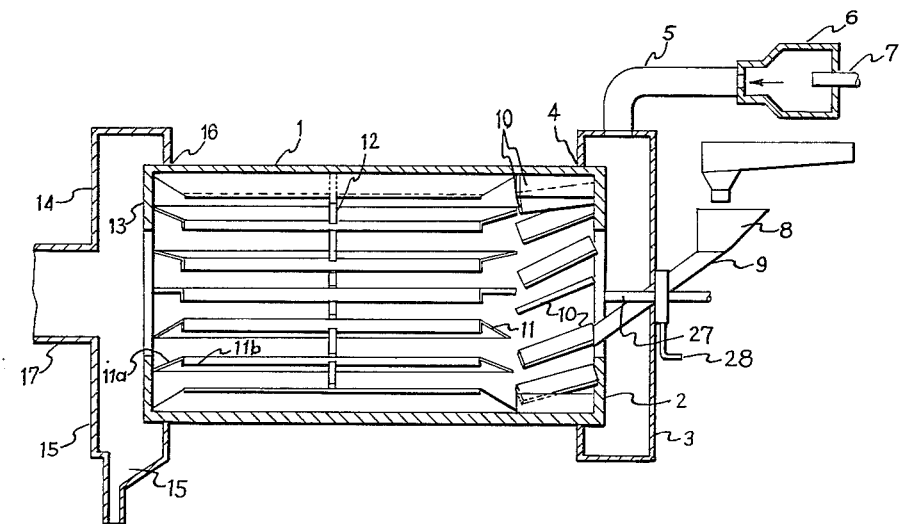
FIG. 2 is a longitudinal section through the drum element and its end appurtenances.

The entrance portion of the drum, as shown in FIG. 2, is provided with a dam means 2 in the form of an annulus. The purpose of this means is to retain in the drum materials delivered to the drum beyond the dam. The entrance end of the drum is also fitted with a manifold 3 which does not rotate with the drum but serves as a means for delivering hot gases to the drum. The manifold may take various forms, and it may be of various sizes. In the illustrated form it is a box shaped structure having a substantially gas tight connection at 4 with the drum, which connection or seal is of such character as to permit the drum to rotate while the manifold remains stationary. The manifold is connected by a hot gas conduit 5 to what may for convenience be called a stove 6. While the hot gases passing through the conduit 5 may be derived from any suitable source, it is generally the practice in carrying out the invention to produce the hot gases in the stove 6 by means of a burner 7 connected to suitable sources of air and fuel. The stove 6 may contain a combustion chamber in which the flame from the burner 7 heats the walls, the heat being transferred to a source of air or other gas in a chamber surrounding the combustion chamber and driven by a fan as will be readily understood by the worker in the art. However, for many purposes the products of combustion of the burner 7 are suitable for use as the hot gases, in which case the combustion chamber of the stove 6 may be connected directly with the conduit 5. The hot gases from the burner 7 will in this instance have a high enough temperature to possess a drying effect within the drum 1 despite the presence in them of any moisture generated by the combustion of the fuel.

A hopper for solid materials entering the drum is connected with a conduit 9 extending slantwise downwardly through the outer wall of the manifold 3 and acting to deliver solid materials to the lower part of the entrance end of the drum 1 inside the dam 2 as shown.

Immediately inside the entrance end of the drum there is a plurality of vanes 10. These vanes may extend inwardly radially, or at some angle to the radii of the drum; but as shown they lie aslant to the longitudinal axis of the drum. Their function is to feed particulate material delivered by the conluit 9 toward the vanes 11 lining the remainder of the drum as hereinafter described. The feeding vanes 10 will produce some agitation of the solid materials fed through the conduit 9 but without the showering action hereinafter described.

The vanes 11 are usually parallel to the longitudinal axis of the drum and extend inwardly from the drum surface in a generally radial direction. It does not depart from the spirit of the invention to give to the vanes 11 a somewhat helical conformation; but ordinarily this is not desirable. The vanes 11 as also shown in FIG. 2 have bodies 11a and lips 11b; and the action of these vanes is to elevate portions of the bed of granular material in the drum and, as the drum rotates, to shower these granules in what will be termed "curtains" vertically and longitudinally of the drum, the curtains, of course, moving across the drum from side to side.

The drum will be provided with one or more intermediate dams 12, which are annular members of about the depth of the vanes 11 and which insure a maximum hold-up of the granular material in the drum so that a large quantity of it will be available in the bed Finally, the drum has at its exit end another dam indicated at 13.

The precise dimensions of the drum are not a limitation on the invention since the proportioning of the parts can be caused to remain substantially the same in drums of different sizes. In an exemplary drum construction, the drum may be five to six feet in diameter and, say, about twenty-five feet long. The first drum section containing the helical vanes 10 may be three to four feet long, and is known as the feeding section. The portion of the drum extending between the feeding section and the first intermediate dam 12 may be ten to twelve feet long. Other intermediate dams may, if desired, be located between the dam 12 and the exit end dam 13, the section of the drum beyond the dam 12 being also about twelve feet long.

At the exit end of the drum there is another manifold 14 which is designed to receive both the hot gases issuing from the drum and the pelletized product spilling over the dam 13. At the lower end of this manifold there may be a receiving means 15 for the pelletized material. The manifold 14 may be sealed to the drum 1 by a rotatable gas seal at 16.

The manifold 14 also has a conduit 17 for the exit of the hot gases. Since the hot gases will normally have a proportion of fines entrained in them, it is usual to connect the conduit 17 to a pump or blower 18 and thence, by a conduit 19, to a centrifugal or other separator 20.

The slurry employed in the process may if desired be made up in a tank 21 provided with a heater 22. Water and solids will be introduced into this tank in any suitable way. Solution may be facilitated by the use of a mixing agitator 23 driven by a motor 24 as well known in the art. The agitator will serve also to keep in suspension in the solution any water insoluble materials introduced into the tank 21 and any undissolved portions of the water soluble substances, so that the slurry delivered by the pump 25 through the conduit 26 to a spray nozzle 27 will be of uniform composition.

In the practice of the invention, air spraying is employed, i.e. the spray issuing from the nozzle 27 is not a spray of the slurry alone propelled by its own pressure but rather a spray in which droplets of the slurry are propelled by air or other suitable gas issuing from the nozzle at the same time. To this end the nozzle 27 has been shown as having a conduit 28 leading to a compressor or other source of gas under pressure.

The dried materials issuing from the drum and collected at 15 will contain some over-sized pellets and some under-sized pellets. As a consequence the issuing material is subjected to suitable screening or separating operations to remove the over-sized and under-sized pellets, leaving pellets having a predetermined range of sizes deemed to be suitable for handling, storage and sale. The under-sized pellets are returned to the hopper 8 as are the over-sized materials after grinding or crushing. Since such apparatus is well known in the art and is illustrated in Patent No. 2,926,079, classification means, grinding means and conveying means have been omitted from the drawings hereof.

It will be noted from the apparatus thus far described that the hot gases, the solids being treated, and the sprayed slurry all pass through or into the treatment drum in a co-current fashion, i.e. in the same direction. It may also be pointed out that the end of the nozzle 27 is located substantially at the entrance to the drum (although it may be located slightly inside the entrance or slightly outside of it), and that there are no additional nozzles located within the drum along its length. While a single nozzle 27 has been illustrated, it does not constitute a departure from the spirit of the invention to provide a plurality of nozzles close to each other and located as described above, i.e. with their spraying ends at or near the entrance to the drum and relatively close to the axis thereof. This may be done if greater spray capacity is desired than can be furnished by any particular nozzle. But there are no nozzles arranged to spray the slurry on the bed; and the sprayed slurry enters the drum surrounded by the hot gases from the manifold 3. The quantity of material being agitated by the vanes 10 and being moved forwardly into the zone of action of the vanes 11 will not be acted upon by the spray.

In the operation of the equipment, comminuted dry material which may be may not be the same as that which is to be pelletized is first charged into the drum to provide a starting bed of material. This is done through the conduit 9. The burner 7 is ignited to heat the gases being carried to the drum through the manifold 3. The material in the feeding section of the drum will be agitated and moved forwardly by the vanes 10 and will be preheated by the hot gases. The typical spraying data hereinafter given is intended to constitute an example of the practice of the process in the best form known to the inventors in accordance with the statute.

When a bed of material has been provided in the drum and the flow of the hot gases has been established, the slurry pump 25 is started and slurry is sprayed through the nozzle 27 into the heated gas stream by means of air or other gas under pressure in conduit 28. In operation, basically, the particles or nuclei, being showered down across the drum in a plurality of traveling curtains, become associated with the sprayed slurry in fine droplets, but by reason of the hot drying gases passing longitudinally through the drum are surface dried to a moisture value below the agglomerating point before they rejoin the bed, or accumulation, of particles in the bottom of the drum. This action is repeated until the particles becomes spherules or pellets, which are then further dried to a condition suitable for handling and shipment in the same apparatus and before they reach the discharge end of the drum. So far as is known, there has not hitherto been devised any apparatus or process whereby both of these actions—the formation of pellets without significant agglomeration by successive coating, and the ultimate drying of the pellets—could be carried on with commercial dependability in a single operation and apparatus.

The operation is a delicate one, being affected by many factors; and it was not until the discoveries and developments set forth herein were made that it become possible not only to control accurately the various actions going on during the operation but also so to segregate and control the pellet-forming and the finished-pellet drying steps as to insure an invariable final result. Among the important factors involved are:

(1) There must be co-current flow of the particulate material, the hot drying gases, and the slurry spray in the drum, (2) there must be an ample supply of hot drying gases controllable as to temperature, quantity and velocity, (3) there must be a proper feeding of dry, preheated particulate material into the pellet-forming zone, (4) the sprayed slurry must be commingled with the hot drying gases at a point ahead of the initial contacting of the spray with the particulate material in the pelletizing zone, and (5) the spraying of the slurry must be fully controllable as to quantity and velocity to the end of adjusting the quantity of slurry solids to be associated with a given quantity of particulate material, and to the end of controlling the penetration of the spray longitudinally of the drum and between the falling curtains of particulate material.

In this procedure the slurry and the solid particles meet in a hot gas stream at a time when the particles are essentially separated, so that there is little or no time for moisture penetration. As the moisture spreads over the surfaces of the particles the hot environment starts immediately to vaporize the moisture from the surfaces of the solid materials. The evaporation effect permits the use of much higher gas temperatures, since the heat does not reach the interior of the solid particles but is consumed in evaporating the water from their surfaces. The solids portion of the slurry adheres to the original particulate material building up its size. A large quantity of material is being treated at any given time compared with the amount of solids entering and leaving the drum, so that the growth of particles into pellets of selected sizes can be controlled by concurrent or sequential control of the quantity of solids being sprayed and the volume and temperature of the hot gases. Moreover, the dynamic nature of the process results in very uniform spherical pellet formation.

In practice it will be found that the drum divides itself throughout its length into different zones of action, such as a first zone in which the introduced particulate materials are preheated and fed forwardly, a second zone in which the particulate materials are coated and recoated so as to become pellets of the desired size, and a third zone in which the pellets are further dried to the extent of attaining proper low moisture and strength for storage or shipment.

Depending upon varying conditions, however, the length of these zones longitudinally of the drum can change and must be adjusted. While its is not possible herein to outline the effect of all of these conditions, since some of them originate outside the drum and have to do with such factors as the quantity and moisture content of the particulate material introduced into the drum, atmospheric conditions etc., certain aspects of control may be pointed out.

In the first place, the particulate material in the first zone of the drum must be adequately dry and adequately preheated. In the second place, the quantity of slurry, considering its water content, associated with the particulate material in the second zone should be sufficient to coat the particles to form the desired pellets without raising the moisture content of the bed to above the agglomeration point. It is advantageous to use as much slurry as possible in the pelletizing process since this down the necessary quantity of recycled material. If too little slurry is associated with the particles the process becomes less efficient. If too much slurry is associated with them, the moisture content of the bed may rise too high or the average size of the pellets may become too great. While the invention is not limited to the production of pellets of a specific size, it will be understood that in commercial practice a particular pellet size will be chose as optimum.

The action in the pellet forming zone is one of repeated coating and preliminary drying of the particulate material. In the third place, a sufficient zone must be provided in the drum after the conclusion of the coating operation for the ultimate drying of the pellets. The length of the coating zone and by consequency the length of the ultimate drying zone depends not only on the quantity of slurry introduced and its solids:moisture ratio, but also on the velocity of the spray, the penetration of the spray longitudinally of the drum and between the falling curtains of particulate material, and the volume, velocity and temperature of the hot gases passing through the drum in the same direction.

With a standardized slurry, these factors are readily controlled by varying the spray and by varying the introduction and temperature of the hot gases. Neglecting the posible provision of a separate source of particulate material in dry form (which would entail aditional expense) it is evident that the process invloves the recycling of a certain quantity of material. But with the apparatus and method of this invention it is readily possible to adjust conditions so that the quantity of correctly sized and saleable pellets will not be so small that the quantity of material necessary for recycling becomes excessive. The quantity of recycled material may vary between about 40% and 60% of the quantity of solids passing through the drum. As has been indicated the solids discharged from the drum are screened, and the fines as well as the over-sized materials must be recycled. An optimum operation may be regarded as one in which the quantity of pellets of proper merchantable size substracted from the total amount of solids passing through the drum leaves the amount of material (fines and over-sized pellets, after crushing) desired for recycling. In a good commercial operation under this invention about 50% of the solids passing through the drum will be recirculated.

Operations as outlined are made possible by the factors which have been set forth. The particulate meaterial entering the drum is preheated in the first zone before coating. It will have a low moisture content, say about 1% or less throughout the bodies of the particles, and it will have been warmed or preheated prior to contact with the sprayed slurry. In the second zone the material will be sprayed repeatedly with substantially instantaneous drying. The drying occurs by surface evaporation and so rapidly that the moisture does not penetrate to the cores of the particles. In the third zone the pellets will be further dried so as to insure a moisture content of 1% or less. This drying is also essentially an evaporative drying: but since it occurs beyond the second zone, the temperature of the hot gases through which the pellets are showered will have been substantially reduced by the evaporative drying in the second zone. Thus, temperature profiles of the solid material throughout the length of the drum show little or no rise in temperature of the particles from the end of the first zone to the point at which they are discharged from the drum. The essentially evaporative drying makes possible a substantial range of adjustment of the spray and the hot gases, and makes it possible for the operator to avoid hot or cold spots in the drum as well as a rise in the moisture content of the bed which would carry it above the agglomeration point.

It is not possible to give specific operation data for the process since these will vary with the materials being treated. However, by way of example, in using a slurry consisting of 83% ammonium nitrate and 17% water the following data were observed in satisfactory commercial operation:

The temperature of the heated air or gas at the inlet to the drum may be 430° F. with a range of substantially 300° to 600° F. The gases exiting from the drum may have a temperature of 195° F. with a range of substantially 150° to 250° F. The temperature of the slurry may be 200° F. with a range of substantially 100° to 250° F. The slurry pressure as determined by the pressure of the air or other atomizing gas at the nozzle may be 65 p.s.i.g. with a range of substantially 40 to 100 p.s.i.g. The temperature of the bed of particulate material may be 210° F. with a range of substantially 160° to 220° F. The apparent velocity of the heated gases through the drum may be 240 ft./min. with a range of substantially 100 to 350 ft./min.

The length and diameter of the drum may be varied in view of the adjustment features set forth above. For pelletizing ammonium nitrate as hereinabove described, the initial or feeding section of the drum may be about four feet in length, while the two remaining sections, having the vanes 11, and as determined by the dam 12, may be about twelve feet in length each. These values, however, are illustrative but not limiting.

Modifications may be made in the invention without departing from the spirit of it. The invention having been described in an exemplary embodiment, what is claimed as new and desired to be secured by Letters Patent is:

1. A process of pelletizing a water soluble material solid at normal temperatures which comprises passing said substance in substantially dry particulate form through a drum, passing heated drying gases through said drum in the same direction as said particulate material, tumbling said particulate material in an entrance portion of said drum so as to dry and preheat it and thereafter throughout the remainder of the drum showering said particulate material downwardly across said drum in a plurality of spaced moving curtains, spraying into said drum from the entrance end thereof a slurry comprising the water soluble material and water, the said spraying being accomplished by means of a compressed gas, and continuously regulating the volume and temperature of the hot drying gases and the volume and pressure of the spray so that the spray penetrates between the moving curtains of particulate material for a portion only of the length of said curtains, droplets of slurry becoming associated with said particulate material within said curtains, said particulate material being dried during its descent to a surface condition below the agglomerating point, there being within said drum a terminal zone in which the particulate material in said curtains is no longer associated with said spray but is dried within said drum to a condition suitable for shipment and storage.

2. A process of making pellets of water soluble material which comprises the steps of passing particulate material through a drum so as to form a bed therein and so as to pick up and shower downwardly across said drum portions of said particulate material in a plurality of spaced moving curtains, passing through said drum heated drying gases in the same direction as the travel of said particulate material, passing into said drum a spray comprising water and said water soluble material, and regulating the said spray and the volume and temperature of the said gases continuously so as to establish within said drum a first zone in which said spray penetrates said curtains and becomes associated with the particulate material therein, the said particulate material being dried at its surfaces to below the agglomeration point, and a second zone in which the particulate material in said curtains is further dried without spraying.

3. The process claimed in claim 2 including an initial step of agitating the particulate material in the presence of said hot drying gases so as to preheat it without spraying it.

4. The process claimed in claim 3 wherein the particulate material in said first zone is coated and recoated with solids from said slurry so as to form pellets, and including the steps of screening pellets discharged from said drum to derive a merchantable fraction, grinding oversized pellets and returning the ground material with fines separated in said screening operation to the entrance end of said drum.

5. The process claimed in claim 4 in which the quantity of material returned to the drum for processing is about 40% to 60% of the throughput of the drum.

6. The process claimed in claim 5 wherein the bed is continuously maintained below the agglomeration point.

References Cited by the Examiner

UNITED STATES PATENTS

| | | | |
|---|---|---|---|
| 2,268,816 | 1/1942 | Gabeler et al. | 18—1 |
| 2,414,700 | 1/1947 | Shoeld | 71—64 |
| 2,436,771 | 2/1948 | Hood | 23—313 |
| 2,867,523 | 1/1959 | Lutz et al. | 71—64 |
| 2,885,279 | 5/1959 | Mortenson | 71—64 |
| 2,914,797 | 12/1959 | Cavanagh | 18—1 |
| 2,926,079 | 2/1960 | Smith | 18—1 |
| 2,933,377 | 4/1960 | Doubt et al. | 23—313 |
| 2,948,918 | 8/1960 | Austin | 264—117 XR |
| 2,979,421 | 4/1961 | Rissman et al. | 18—1 XR |
| 3,060,496 | 10/1962 | McDowell et al. | 18—1 |
| 3,092,489 | 6/1963 | Smith | 264—117 XR |

FOREIGN PATENTS

| | | |
|---|---|---|
| 581,133 | 10/1946 | Great Britain. |
| 619,888 | 3/1949 | Great Britain. |
| 1,203,121 | 1/1960 | France. |

ROBERT F. WHITE, *Primary Examiner.*

MICHAEL V. BRINDISI, ALEXANDER H. BRODMERKEL, *Examiners.*